Feb. 15, 1949.  E. F. FISHER  2,461,814
SLUDGE HANDLING AND DISPOSAL SYSTEM
Filed Jan. 22, 1945  3 Sheets-Sheet 1

Inventor
Ernest F. Fisher
By
Martin T. Fisher,  Attorney.

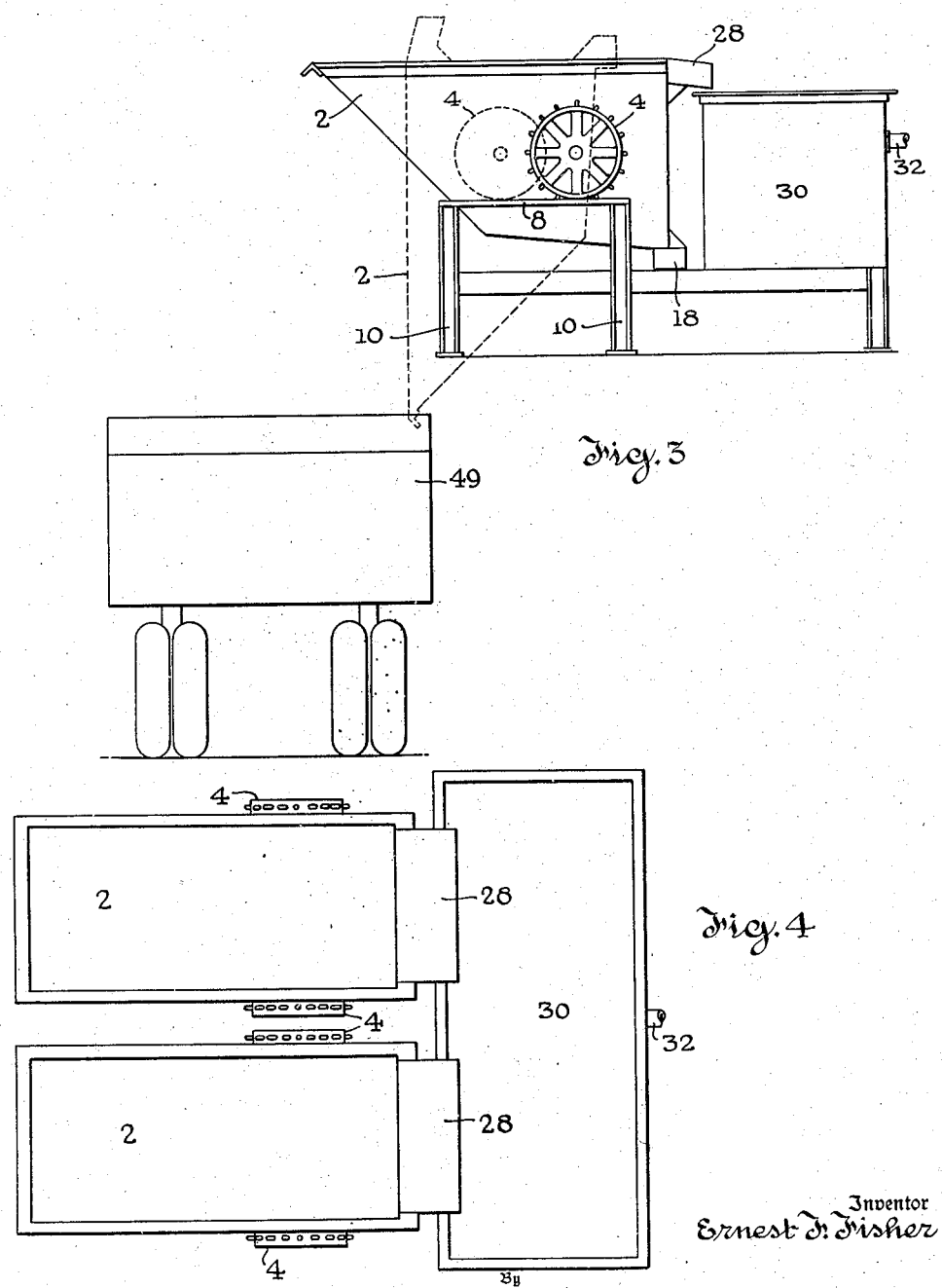

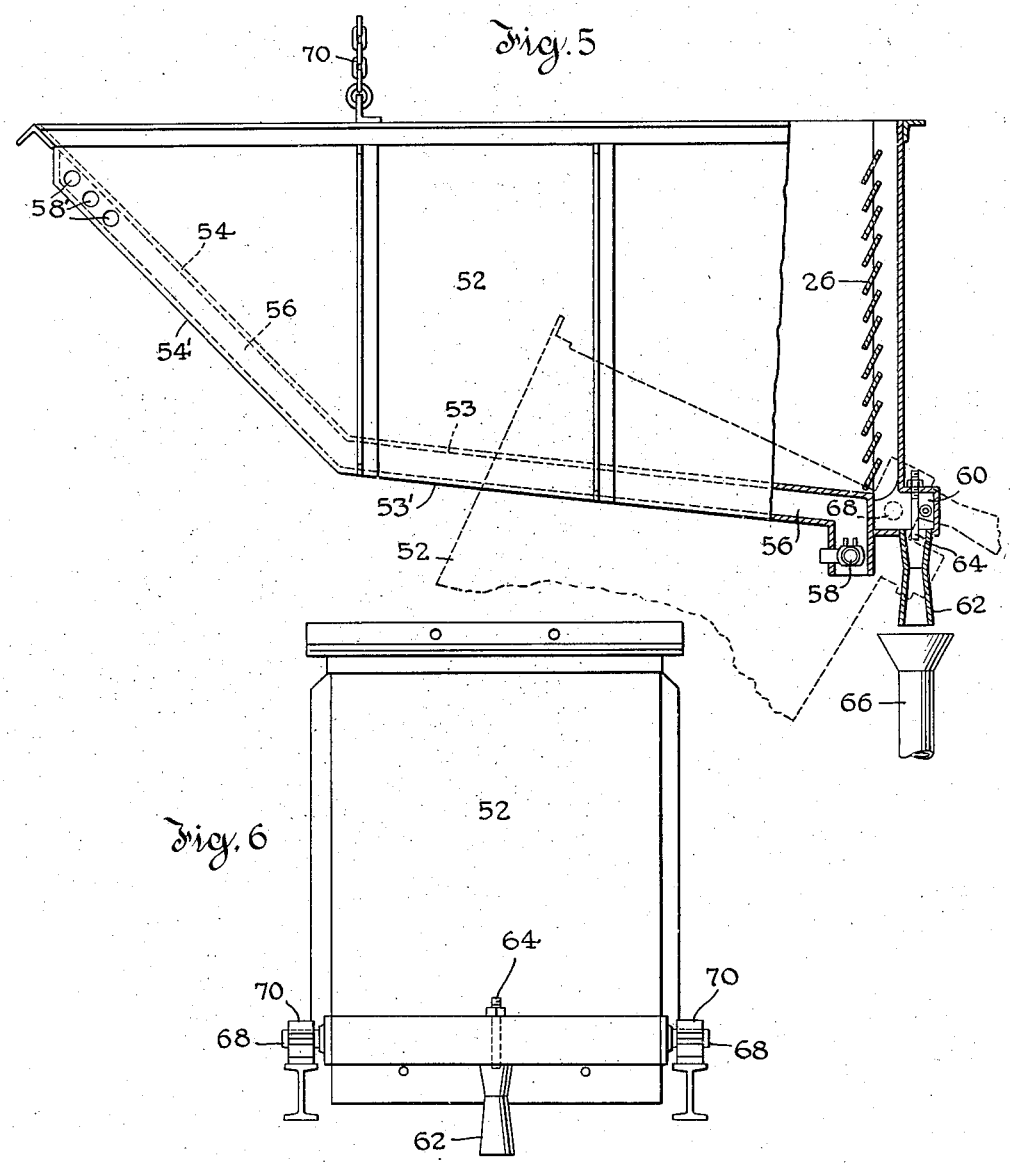

Patented Feb. 15, 1949

2,461,814

UNITED STATES PATENT OFFICE 2,461,814

SLUDGE HANDLING AND DISPOSAL SYSTEM

Ernest F. Fisher, Harvey, Ill., assignor to Whiting Corporation, Harvey, Ill., a corporation of Illinois Application January 22, 1945, Serial No. 573,985

3 Claims. (Cl. 210—52)

This invention relates to a sludge handling and disposal system, and one object thereof is to provide a sludge collecting and dewatering tank which is an improvement on that of my Patent 2,248,665, dated July 8, 1941.

Another object of the invention is to provide a sludge collecting and dewatering tank which may be readily and completely emptied of sludge periodically by tiling it and dumping it instead of the laborious handling of the sludge with a shovel through a door. A further object of the invention is to provide a stationary clear water tank to receive the overflow water from one or more sludge collecting and dewatering tanks of this type, and to provide improved means for dewatering the sludge.

The sludge collecting and dewatering tank and the stationary clear water tank are particularly for handling sludge formed in dust collecting apparatus of the type that utilizes water for wetting and precipitating the dust. Dust collectors of this type produce a sludge which, after a time, will settle and separate into clear water and heavier sludge. The clear water may, if desired, be pumped back into the dust collector and used again, and economy in water thereby effected, while the sludge may be treated, if desired, to collect any values therein, such, for example, as particles of metal, or the sludge may be hauled to a dump for disposal.

More particularly, the tank of this invention is provided with an inclined wall which slopes upwardly and outwardly, to facilitate dewatering and dumping, and the tank is pivotally mounted to tip so that accumulated sludge may be dumped toward and over said inclined wall. Means for heating the sludge tank and suction means for rapidly removing drainage water are provided, if desired, and as will be described.

The pivotal mounting of the tank may be on a fixed pivot, but it is preferably in the form of rolling trunnions which roll or travel on guideways alongside the tank, so that the tank has a bodily movement back and forth horizontally, as well as a tipping movement for dumping the sludge therefrom.

The end of the tank opposite the inclined wall is provided with an overflow, and with a vertical series of inclined louvres of the type shown in my prior patent (2,248,665), for facilitating draining off substantially clear water through a sump at the bottom of the tank.

The tank is of substantial size so that as the slurry is fed into it, the heavier sludge gradually settles to the bottom and builds up in a thick layer, while the clear water passes out by the overflow into a stationary clear water tank positioned alongside the sludge tank. The clear water tank may be provided with a pump for sending the clear water back to the dust collector for re-use, thereby effecting an important economy in the water used.

After a substantial amount of sludge has settled out in the tank, a suitable drain is opened to drain off through the sump as much surplus water as possible, then the tank is moved along manually or mechanically on its trunnions and tipped, so that the dewatered sludge drops out of the tank into a suitable truck or other receptacle.

The invention will be further described in connection with the accompanying drawings, wherein:

Fig. 3 is a diagrammatic side elevation showing the dumping operation;

Fig. 4 is a diagrammatic plan view showing a plurality of dewatering tanks, overflowing into a common clear water tank.

Fig. 5 is a side view, partly in section, and Fig. 6 an end view, of a modification wherein the sludge is heated during the dewatering operation.

Figure 1:
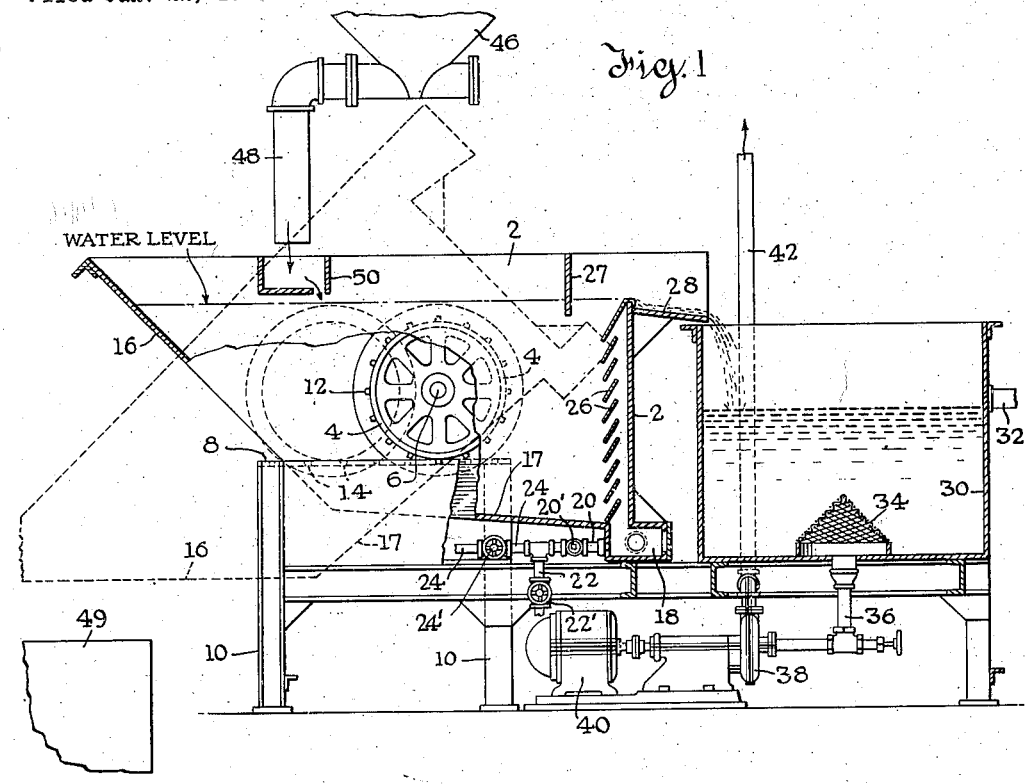
Fig. 1 is a vertical longitudinal section of the sludge tank embodying one form of the invention.
Figure 2:
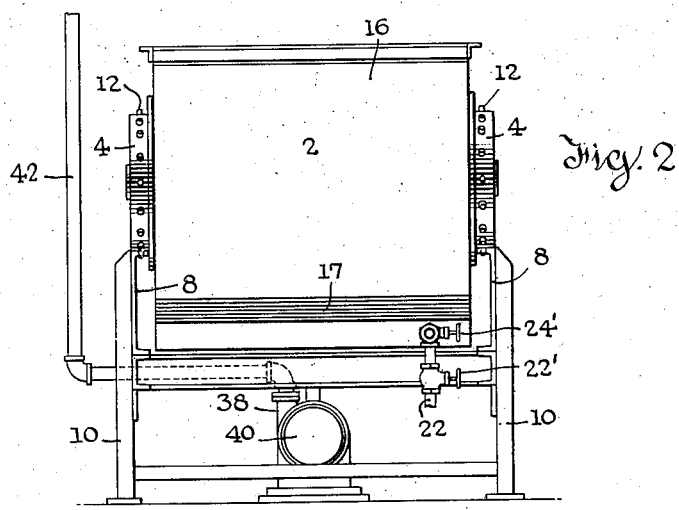
Fig. 2 is an end view of the same.

Referring now to these drawings, the sludge collecting tank, indicated generally at 2, is mounted on a pair of laterally spaced, wheel type rolling trunnions 4.

The trunnions 4 roll on a pair of horizontal laterally spaced guideways 8 on standards 10 and are provided with outwardly extending peripheral pins 12 which are engageable in holes 14 in the guideways 8 and coact with said guideways to form gear and rack connections. The trunnions 4 are fixed to the side walls of the tank 2, so that as they roll along the guideways 8 to the left, they cause the tank to tip to the dotted line position, Fig. 1, and to move the tank back to its normal position, when they travel to the right.

The tank 2 is provided with an upwardly and outwardly inclined wall 16, over which the sludge passes in the dumping operation when the tank is tilted to the dotted line position shown in Fig. 1. The bottom wall 17 of the tank slopes slightly toward a drainage sump 18, thereby facilitating the dewatering of the sludge.

The sump is disposed opposite the wall 16 of the tank and is connected by a pipe 20 to a drain pipe 22, pipe 20 also being connected by a T-connection to a fresh water flush pipe 24, for flushing the sump 18, pipes 20, 22 and 24 being provided with valves 20′, 22′ and 24′. In order to allow for the tilting operation of the tank, the outer portions of the pipes 24 and 22 may be in the form of flexible rubber hose, rather than rigid pipes.

This same end of the tank is also provided with a vertical series of diagonally arranged, overlapping louvre plates 26, which hold back the sludge but which allow clear water to drain through into the sump 18.

The tank is also provided with a skimmer plate 27 for holding back floating solids, and with an overflow weir 28. The latter delivers substantially clear overflow water to a stationary clear water tank 30 which is provided with an overflow pipe 32. In the even it is desired to use the water from the clear water tank 30 again, there is provided a screen 34 over the inlet of a pipe 36. Such pipe is connected to a pump 38 which is driven by an electric motor 40, and serves to pump clear water into a pipe 42 for use again in the wet dust collector, the lower portion of which is shown at 46.

The slurry from the dust collector 46 is delivered to pipe 48 and thence into a distributing box 50 for delivery into the tank 2.

The operation is as follows:

The slurry from the dust collector 46 is passed into the tank 2 until a substantial amount of sludge is settled out in the tank 2; clear water, or substantially clear water, meanwhile passes over the overflow weir into clear water tank 30.

When a substantial amount of sludge has accumulated in tank 2, the sludge is dewatered by opening valves 20′ and 22′, the water valve 24′ being opened occasionally during the process of dewatering to assist in flushing sump 18 and clearing the pipe connections of obstruction so that the water from the sludge will drain freely. Because of the sloping wall 16, and the adjoining bottom wall 17 which slopes gently to the sump 18, the water drains freely to the sump.

When the sludge has been sufficiently dewatered, tank 2 is tilted to the left on its rolling trunnions 4 to the position shown by the dotted outline of the tank. The sludge then discharges into a receptacle, such as a truck 49. In Fig. 1, the tank is shown as tilted about 45°, in Fig. 3 the tilt is about 90°.

If desired, and as shown in Fig. 4, a number of sludge collecting tanks of the type just described may be arranged to overflow into a common pool in a single clear water tank 30. While one sludge tank is being dumped, the other remains in operation, and so there is no interruption to the operation of the dust collector 46, which can be arranged to discharge its slurry into either tank 2 and so it may be continually operated.

Figures 5 and 6 show a modification of this invention wherein provision is made to heat the sludge while it is being dewatered and to continue the heating after it is dewatered to bring the sludge to any degree of dryness. Experiment has shown that when the water in the sludge is heated to a temperature of about 212 degrees or under while the water is being drained from the sludge, the speed of dewatering is increased very materially.

Referring to Figs. 5 and 6, the sludge tank 52 is provided with an inclined bottom 53 and inclined end 54, as before. The tank is heated preferably by providing a false bottom 53′, 54′, defining a gas or flue space 56 which extends across and underneath the tank. To the space 56 hot gases are supplied from a gas or oil burner 58. Such hot gases flow along and under the tank and flow out of the heating space 56 by way of holes 58′.

In order further to aid the dewatering, the drainage sump 60 is provided with one or more aspirating Venturi tubes 62, into which air or water under pressure is directed from a pressure pipe 64 into a drain 66. The suction which is thereby created keeps the sump well drained at all times.

In order to dump tank 52, it is pivotally mounted on trunnions 68 which are journalled in bearings 70. The other end of the tank is supported in any convenient way, as by a chain 70 which can be slackened for allowing the tank to pivot about its trunnions as shown in dotted lines, for dumping the dewatered sludge.

I claim as my invention:

1. A sludge handling and disposal system comprising a supporting structure, an open top clear water tank mounted fixedly on the supporting structure and provided with drain means, means over the supporting structure and at one side of the clear water tank for discharging slurry downwards, a separate settling tank at said one side of the clear water tank, positioned normally under the discharging means so as to receive slurry therefrom, embodying an inner end wall adjacent the clear water tank, an outer end wall, and a bottom between the two end walls, and having the bottom and the outer end wall thereof inclined upwards and outwards so that the sludge component of the slurry in the tank gravitates towards the inner end wall, sludge baffling means disposed in the settling tank inwards of the inner end wall, a drain-equipped sump disposed in the settling tank between the baffling means and the lower end of the inner end wall, a weir disposed in the settling tank adjacent the upper end of said inner end wall and adapted to discharge the clear water component of the slurry into the clear water tank, and pivot means between the supporting structure and the settling tank for supporting said settling tank so that it is capable of being tilted outwards and downwards into a discharging position wherein the collected sludge is discharged over the normal upper end of the outer end wall.

2. A sludge handling and disposal system comprising a supporting structure, an open top clear water tank mounted fixedly on the supporting structure and provided with drain means, means over the supporting structure and at one side of the clear water tank for discharging slurry downwards, a separate independent settling tank at said one side of the clear water tank, positioned normally under the discharging means so as to receive slurry therefrom, embodying an inner end wall adjacent the clear water tank, an outer end wall, and a bottom between the two end walls, and having the bottom and the outer end wall thereof inclined upwards and outwards so that the sludge component of the slurry in the tank gravitates towards the inner end wall, sludge baffling means disposed in the settling tank inwards of the inner end wall, a drain-equipped sump disposed in the settling tank between the baffling means and the lower end of the inner end wall, a weir disposed in the settling tank adjacent the upper end of said inner end wall and adapted to discharge the clear water component of the slurry into the clear water tank, and means for supporting the settling tank so that it is capable of being shifted bodily away from the clear water tank and at the same time tilted automatically outwards and downwards into a discharging position wherein the collected sludge is discharged over the normal upper end of the outer end wall.

3. A sludge handling and disposal system comprising a supporting structure, an open top clear water tank mounted fixedly on the supporting structure and provided with drain means, means over the supporting structure at one side of the clear water tank for discharging slurry downwards, a separate independent settling tank at said one side of the clear water tank, positioned normally under the discharging means so as to receive slurry therefrom, embodying an inner end wall adjacent the clear water tank, an outer end wall, and a bottom between the two end walls, and having the bottom and the outer end wall thereof inclined upwards and outwards so that the sludge component of the slurry in the tank gravitates towards the inner end wall, sludge baffling means disposed in the settling tank inwards of the inner end wall, a drain-equipped sump disposed in the settling tank between the baffling means and the lower end of the inner end wall, a weir disposed in the settling tank adjacent the upper end of said inner end wall and adapted to discharge the clear water component of the slurry into the clear water tank, and means for supporting the settling tank so that it is capable of being shifted bodily away from the clear water tank and at the same time tilted automatically outwards and downwards into a discharging position wherein the collected sludge is discharged over the normal upper end of the outer end wall, said means consisting of a pair of horizontal, laterally spaced guideways supported on the supporting structure, and in addition a pair of wheel shaped trunnions mounted fixedly on the sides of the settling tank and arranged in engaging relation with, and to roll on, the guideways.

ERNEST F. FISHER.

REFERENCES CITED

The following references are of record in the file of this patent:

UNITED STATES PATENTS

| Number | Name | Date |
|---|---|---|
| 688,493 | Stebbins | Dec. 10, 1901 |
| 876,713 | Harden | Jan. 14, 1908 |
| 1,317,971 | Gentile | Oct. 7, 1919 |
| 1,793,620 | Jacobus | Feb. 24, 1931 |
| 1,908,691 | Coe | May 16, 1933 |
| 1,916,367 | Green | July 4, 1933 |
| 1,986,913 | Anthony | Jan. 8, 1935 |
| 2,196,991 | Jacobs et al. | Apr. 16, 1940 |
| 2,237,204 | Wallin et al. | Apr. 1, 1941 |
| 2,248,665 | Fisher | July 8, 1941 |

FOREIGN PATENTS

| Number | Country | Date |
|---|---|---|
| 4,686 | Great Britain | 1914 |
| 17,230 | Norway | Jan. 13, 1908 |
| 38,136 | Switzerland | May 14, 1906 |
| 211,613 | Great Britain | Feb. 28, 1924 |
| 390,051 | France | July 18, 1908 |
| 390,603 | France | Aug. 3, 1908 |
| 802,370 | France | June 6, 1936 |